(12) United States Patent
Kristensen et al.

(10) Patent No.: US 9,168,678 B2
(45) Date of Patent: Oct. 27, 2015

(54) FLEXIBLE MAT FOR PROVIDING A DYNAMICALLY RECONFIGURABLE DOUBLE-CURVED MOULDING SURFACE IN A MOULD

(75) Inventors: Mathias Kraemmergaard Kristensen, Aalborg (DK); Christian Raun Jepsen, Aalborg (DK)

(73) Assignee: Adapa ApS, Aalborg (DK)

( * ) Notice: Subject to any disclaimer, the term of this patent is extended or adjusted under 35 U.S.C. 154(b) by 255 days.

(21) Appl. No.: 13/885,907

(22) PCT Filed: Nov. 17, 2011

(86) PCT No.: PCT/DK2011/050439
§ 371 (c)(1),
(2), (4) Date: Jul. 30, 2013

(87) PCT Pub. No.: WO2012/065614
PCT Pub. Date: May 24, 2012

(65) Prior Publication Data
US 2013/0299084 A1  Nov. 14, 2013

(30) Foreign Application Priority Data
Nov. 17, 2010 (DK) .................................. 2010 01041

(51) Int. Cl.
*B29C 33/34* (2006.01)
*B28B 7/02* (2006.01)
*B29C 33/30* (2006.01)

(52) U.S. Cl.
CPC ................. *B29C 33/34* (2013.01); *B28B 7/025* (2013.01); *B29C 33/307* (2013.01)

(58) Field of Classification Search
CPC ........ B29B 7/025; B29C 33/307; B29C 33/34
See application file for complete search history.

(56) References Cited

FOREIGN PATENT DOCUMENTS

| DE | 198 23 610 A1 | 12/1999 |
|---|---|---|
| FR | 2 612 545 A1 | 9/1988 |
| GB | 2 268 699 A | 1/1994 |

*Primary Examiner* — James Sanders
(74) *Attorney, Agent, or Firm* — Roberts Mlotkowski Safran & Cole, P.C.; David S. Safran

(57) ABSTRACT

A flexible mat (1) for providing a dynamically reconfigurable double-curved moulding surface (40) in a mould. The flexible mat (1) comprises a system of rhomboid flat elements (10, 10', 26, 26') of an elastic deformable material arranged mutually movably in two or more relatively rotated layers (10, 10'), surrounded by a first upper cloth (6) of an elastic deformable material and a second lower cloth (8) of an elastic deformable material. The cloths (6, 8) are imperviously joined along their lateral limits and form an adjustable impervious chamber. The flexible mat (1) is adapted to be mechanically connected to the free ends (42) of a number of actuators (3) in such a way that the position of a given point on the surface (40) formed by the flexible mat (1) is determined on the basis of the position of the free end (42) of an associated given actuator (3). The mat (1) is capable of forming a uniform, continuous double-curved surface.

23 Claims, 3 Drawing Sheets

FLEXIBLE MAT FOR PROVIDING A DYNAMICALLY RECONFIGURABLE DOUBLE-CURVED MOULDING SURFACE IN A MOULD

The present invention concerns a device for use in a moulding tool, preferably moulds of the type that provide a dynamically reconfigurable double-curved surface, the shape of which, from an initial shape, is caused by the impact of a force deriving from mobile free ends of a number of actuators.

Digitally controlled moulding tools capable of producing a physical representation of a digitally designed surface fast and precisely based on information from a CAD program are advantageous when producing series of uniquely curved and double-curved workpieces.

The most widely used technology when producing individual moulds on the basis of digital drawings is to mill the mould from a block of a suitable material using CNC milling. This process is protracted where a smooth surface is required, and a lot of both energy and materials are wasted.

When producing workpieces of fairly uniform or related shapes, it may, therefore, be advantageous to have a mould that can assume various shapes fast and without waste. A branch of such dynamically reconfigurable moulds comprises moulds that are designed to create uniform single- and double-curved surfaces for use in e.g. the production of individually produced façade elements in organically shaped architecture. Several attempts have been made to produce such a mould. Their common feature is that they contain a greater or smaller number of actuators, each of which defines a point on a surface. One end of the actuators is fixed in a frame, and membranes or sheets are fixed across their free end, possibly supported by a network of flexible profiles that are designed to form a closed surface that can be used for moulding and the like.

FR 2612545A shows a mould device in which a number of actuators arranged in a rectangular pattern are controlled individually in the longitudinal direction by a computer processor. A rectangular sheet is fitted on a ball joint on the free end of each actuator and partly overlaps adjacent sheets in such a way that the sheets together form a closed surface. The surface formed thus consists of larger or smaller surfaces, depending on the number of actuators and the distance between them. One problem with this prior art device is that, even with a large number of closely-spaced actuators, the surface produced will not be even and uniform. It will consist of a number of flat facets as the rectangular sheets do not produce regular transitions and continuous curves.

GB 2268699A shows a device for shaping fibre-reinforced plastic laminates in which an elastic deformable material is supported by a number of distributed actuators. By placing fibres in the laminate, rigidity is achieved and the actuators are used to force the initially flat laminate to assume a single- or double-curved shape. This takes place in several stages. Fibres are laid out to produce rigidity in the laminate before deformation a number of times, after which more fibres are positioned and the laminate is hardened to maintain its new shape. In this device, it is possible, as indicated in the patent, to achieve a uniform surface, compared with the mould device mentioned previously, with continuous curves at a distance between the actuators of 500 mm to 1,000 mm, as the rigidity in the laminate entails interpolation between the points defined by the actuators. One advantage of this prior art device is that a uniform, continuous surface is achieved using relatively few actuators. One problem with the device is that the surface precision depends on the ability, during the process, to control the rigidity of the laminate, which means that the device is used solely to produce laminates. The fine control of the rigidity also requires a relatively high, expensive complexity of machinery, processes and calculations.

DE 19823610A shows a method for producing three-dimensional shell sections in which a rectangular lattice of joined elastic deformable stiffeners is linked in the joints to an underlying adjustable system of, for example, actuators. By deflecting the lattice under the impact of the underlying adjustable system, the stiffeners connected via torque pins will, by means of their rigidity, form curves in the directions of the lattice between the joints defined by the underlying adjustable system. A cloth or sheet of elastic deformable material is placed over the lattice, producing a sealed surface that can be used to mould shell sections. One problem with this method is that, to achieve a uniform, continuous surface over the curves defined by the lattice, it is necessary either to use a relatively dense lattice, which means a large number of actuators, making the intended method expensive, or to use a cloth or a sheet of relatively high rigidity or thickness that, made of an isotropic material such as rubber or silicone, will achieve excessive rigidity if it is to form a uniform surface, to be able to form double-curved surfaces with sufficiently large curves in relation to the number of actuators used.

The aim of the invention is to provide a device of the type mentioned in the introduction that, in a simple, fast process, can provide a single- or double-curved surface using few actuators in relation to the possible curves.

Moreover, an aim of the invention is for the surface provided to be regular and uniform with continuous curves in all directions.

Another aim of the invention is to be able to determine the course of the edges of the surface formed and to be able to maintain them in a constant position, regardless of the intended deflections of the rest the surface area.

According to the invention, this is achieved by means of a device of the type mentioned in the introduction, which is characterised in that the dynamically reconfigurable double-curved surface is provided by means of a flexible mat, consisting of a system of relatively displaceable supported rhomboid flat elements made of an elastic deformable material arranged in two or more mutually relatively rotated layers, surrounded by a first upper cloth of an elastic deformable material and a second lower cloth of an elastic deformable material, the cloths being imperviously joined along their lateral limits and form an adjustable impervious chamber and where the flexible mat is mechanically connected to the free ends of the actuators in such a way that the position of a given point on the surface formed by the flexible mat is determined on the basis of the position of the free end of an associated given actuator.

To contribute to the deflection of the rhomboid flat elements, it is possible, in a preferred embodiment of the invention, to establish and maintain a pressure difference across the first upper and the second lower cloth, respectively, between an internal side that is oriented towards the system of rhomboid flat elements, and an external side oriented away from the system of rhomboid elements, where the pressure on the internal side is lower than the average of the pressure on the external sides. By means of this device, a flexible mat is achieved that can essentially achieve a uniform bending resistance about all axes out of its own plane and that can also, using few forces, be expanded or compressed in its own plane and thus assume a double-curved shape when being deflected from an initial/original shape such as a plane.

When reference is made in the following to an initial shape, this must be understood as the shape from which the surface of the moulding table departs before the surface forms a curved or double-curved surface by the displacement of relevant actuators. In connection with the use of the device according to the invention for moulding workpieces where uniform thickness is required, the initial shape of the moulding table may e.g. preferably consist of an essentially horizontally oriented surface which is deflected after material has been laid out when the material has achieved suitable viscosity to allow the moulding of curved or double-curved surfaces, while preventing local deviations in the thickness of the moulded workpiece.

In a special embodiment of the device according to the invention, with the aim of achieving high rigidity in connection with the deflection of the flexible mat in relation to resistance to extension in its own plane, the greater part of the total rigidity to deflection may be provided by the rhomboid flat elements.

In order to achieve uniform rigidity of the flexible mat in deflections about given axes out of the plane defined by the surface formed, the mutually rotated layers of rhomboid flat elements may consist of rhomboid flat elements of the same thickness and rigidity. Thereby, essentially uniform rigidity is achieved in all given axes at a given point out of the plane defined by the flexible mat in the point. For example, it possible to approximate uniform rigidity with two layers of identically formed rhombuses mutually rotated at an angle of 90 degrees.

In order to achieve varying rigidities of the flexible mat in deflections about given axes out of the plane defined by the surface formed, the mutually rotated layers of rhomboid flat elements may vary in thickness or rigidity. As a result of this, varied rigidity is achieved in the directions of the respective layers and a graduation of rigidities in the layers as required, as the individual layers are mutually relatively rotated.

In order to achieve a uniform surface of the flexible mat, the rhomboid flat elements may, in at least one of the layers of rhomboid flat elements, have a mutual spacing, the size of which is determined by the size of the deformation of the flexible mat's surface from the initial shape. As a result of this, a surface of the flexible mat is achieved in which a vacuum formed between the elastic cloths does not result in local depressions in the cloths down in the spaces between the rhombuses and a uniform surface can thus be achieved.

In order to achieve a dynamic reconfiguration of a flexible mat from a given shape by causing it to be deflected, the rhomboid flat elements may, in at least one of the layers of rhomboid elements, be shaped so that they are arranged on a flat, single-curved or double-curved surface formed from the flexible mat and form the basis for dynamic deflections and thus jointly form a uniform and essentially closed surface.

As a result of this, deflection of the flexible mat from an initial shape is achieved, caused by the impact of a force deriving from the mobile free ends of a number of linear actuators, for example of the type that operate electromechanically, to which the flexible mat is mechanically connected in such a way that the position of a given point on the surface formed by the flexible mat may be determined on the basis of the position of the free end of an associated given actuator. This makes it possible to reconfigure the initial shape in a defined manner, where a set of the points of the surface defined by the flexible mat may be known on the basis of the positions of the actuators.

In order to cause the actuators to assume specific lengths in order to achieve a predefined single- or double-curved surface, positions of the free ends of the respective linear actuators, which are mechanically connected to the flexible mat, may be registered and supplied to a data processing unit with signal devices to control the movement of the free end of each actuator, and thus the point on the flexible mat belonging to the free end of the actuator, to a desired position.

Thereby, each actuator may be caused independently to assume a predefined position, causing the surface formed by the flexible mat to assume a course via a series of defined points which could, for example, be read off on a digital presentation of a surface.

In order to achieve the ability to connect the individual rhomboid elements via their area mid points to the area mid points of an overlaid or underlaid rhomboid element in an adjacent layer, the flat rhomboid elements in two or more adjacent layers may be arranged in such a way that the area center point of all rhombuses in a given layer is placed directly above or below the area center point of a rhomboid flat element in an adjacent layer.

In order to avoid the rhomboid elements in one layer being jammed together during mutually relative displacement, a number of the rhomboid elements in a layer may be individually connected via their area center point to the area center point in an overlaid or underlaid rhomboid element in an adjacent layer, thereby preventing mutual displacement in the plane of the surface formed by the flexible mat between two overlaid connected rhombuses.

In this way, the rhomboid elements are fixed in their longitudinal direction by rhombuses oriented at a different angle in an adjacent layer without being able to be jammed in place between adjacent elements in the same layer.

In order to distribute the rhombuses and the spacing between the rhombuses which arises in connection with the extension caused by deflection of the flexible mat evenly, a number of connections between rhombuses in two or more overlaid layers may also be used to fix the connected flat rhomboid elements to the first or the second flexible cloth so that an extension of the flexible mat in its own plane during deflection, and thus elastic displacement of the first and the second flexible cloths results in evenly distributed mutual spacing between adjacent rhombuses in the overlaid layers concerned, with mutually relative movement of the connections away from each other as a result of the elastic extension of the cloth between the connections concerned.

This provide for a more uniform surface of the flexible mat and more uniformly distributed rigidity in the deflection of the mat.

In order to fix the flexible mat to the free ends of a number of free actuators or to a lattice of underlying stiffeners in connection with the free ends of linear actuators, a number of connections between at least two layers of rhomboid elements and the first or the second elastic cloth may also constitute mechanical connections between the flexible mat and the free ends of the actuators, or mechanical connections to a lattice of underlying stiffeners connected to the free ends of the actuators.

In order to be able to arrange the rhomboid flat elements in several overlaid layers with mutually overlaid centers, where each layer of rhombuses forms a sealed, uniform surface with no or virtually no mutual spacing between adjacent rhomboid elements, the rhomboid flat elements may, in a preferred embodiment of the invention, at a given point, have two angles v1 and v2, seen from a direction perpendicular to the surface defined by the flexible cloth in the point, of between 13° and 15°, most preferably 14°, or any angle v that satisfies the expression $\tan(v)=1/N$ where N is 4 or any other integer other than zero.

In order to achieve uniform rigidity of the flexible mat in deflections about given axes out of the plane defined by the surface formed or in order to be able to vary the rigidity of such a deflection about two axes that are perpendicular to each other, and to achieve the best possible protection against the individual rhomboid flat elements becoming jammed together and the ability to achieve an essentially uniform rigidity in deflection from the plane defined by the flexible mat about all axes, at least two of the layers of rhomboid flat elements may be mutually relatively rotated at an angle of between 80° and 100°, preferably 90°, about an axis perpendicular to the surface of the flexible mat.

In order to ensure that the rhombuses are better able, in their width, to follow curves of rhombuses in adjacent layers, and thus achieve a more uniform surface, the rhomboid flat elements in some embodiments of the invention may, in deflection about an axis running between their opposing acute angles, have reduced rigidity, caused by the use of an anisotropic material or by details in the geometric design of the rhombuses. A detail of the geometric design of the rhombuses might consist of cuts.

In order for the rhombuses, in connection with deflection caused by an evenly distributed pressure on their surface, to be able to assume a shape that results in a more uniform surface of the flexible mat, the distribution of moments of resistance in the longitudinal direction of the rhomboid flat elements may, with the use of an anisotropic material or details or cuts, in the geometry of the rhombuses, cause a circular or curved deflection under the impact of an evenly distributed surface load perpendicular to one side of the rhombuses and a counteracting support in the center of the opposite side.

To cause additional equalisation of the surface of the flexible mat, in some embodiments of the invention there may be a mat of an elastic foamed material, for example neoprene, between the first upper cloth and the layers of rhomboid flat elements.

In a preferred embodiment of the device in accordance with the invention, the pressure difference between the inner side oriented towards the rhomboid flat elements and the outer side of the first upper and the second lower cloths may be provided by the adjustable impervious chamber, formed by the first upper cloth and the second lower cloths, and containing the layers of flat rhomboid elements, being connected via an airtight connection to the suction side of a vacuum pump.

In a further embodiment of the device in accordance with the invention, the external surface of the first upper cloth or the second lower cloth may be made of a suitable material that is sufficiently dense and robust to resist the physical and chemical impact of a relevant moulding process directly on the surface.

In order to be able to vary a shape, where a constant profile is required, or to make it possible to manufacture a mould with fixed lateral limits, the device may, in further embodiment of the invention, comprise the necessary and adequate means to ensure that the flexible cloth's limits are maintained unchanged during deflection of the rest of the area of the cloth.

The invention also comprises a moulding tool comprising a device as indicated above, plus use of such a moulding tool in connection with moulding thermoplastic, hardening or drying substances such as acrylic plastic, glass, concrete, gypsum, polyester and epoxy.

The invention also comprises a method for producing single- or double-curved workpieces with a moulding tool comprising a device according to the invention, comprising the following process steps: laying out material on the surface of the flexible mat prior to deflecting it, followed by deflection of the flexible mat until a time at which the viscosity or rigidity of the cooling, hardening or drying material is sufficiently high to prevent local mutual deviations in the thickness of the workpiece caused by gravitational force.

The invention will be explained in further detail in the following with reference to the drawing, in which.

Figure 1:
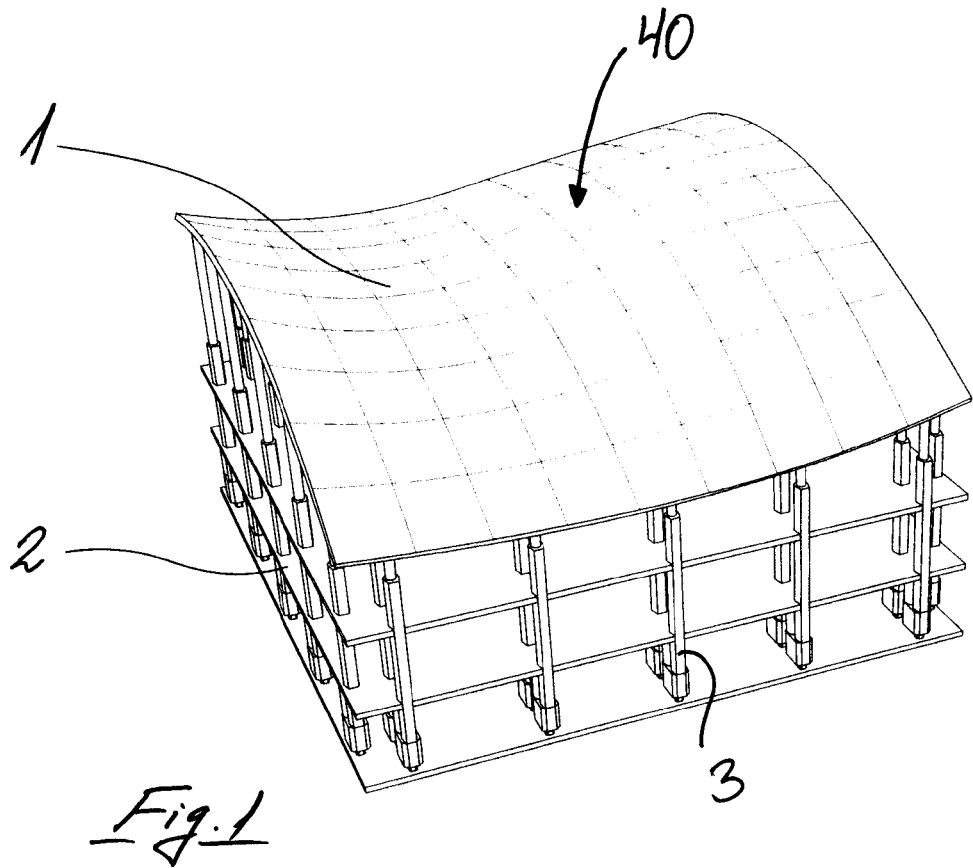
FIG. 1 shows a schematic view of a moulding table with an embodiment of a device in the form of a flexible mat for the provision of a uniform double-curved surface in accordance with the invention.

Reference is made first to FIG. 1, where a flexible mat 1 in accordance with the invention is shown in deflected state and fixed to an underlying system 2. The flexible mat 1 may, in accordance with the invention, be produced in any flat, single-curved or double-curved basic shape, provided it is a shape with continuous curves in all directions.

Figure 2:
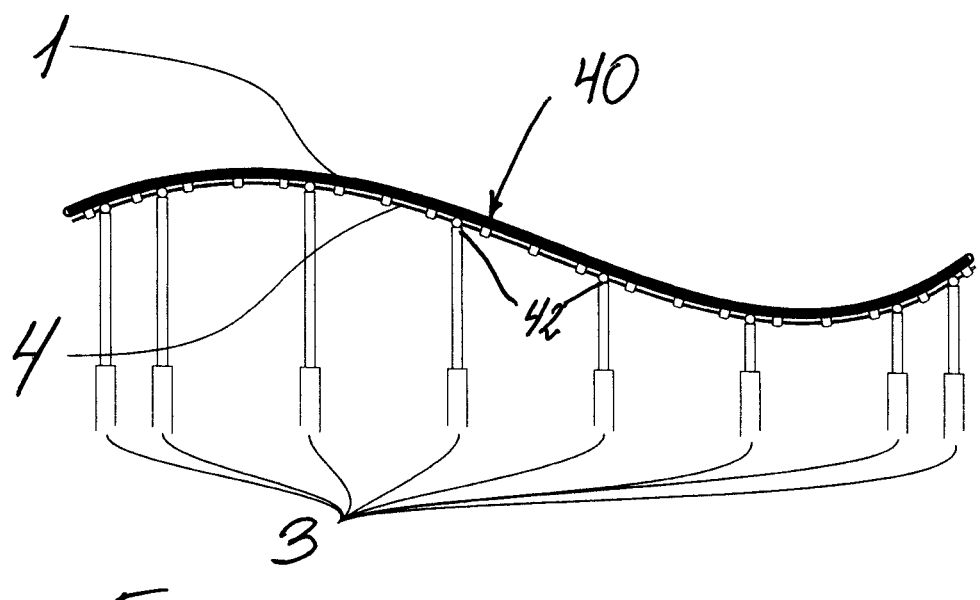
FIG. 2 is a diagrammatic cross-section of an embodiment of the moulding table shown in FIG. 1 in accordance with the invention, in which the flexible mat, which is shown in deflected state, is fixed to the free ends of the actuators using underlying stiffeners.
Figure 3:
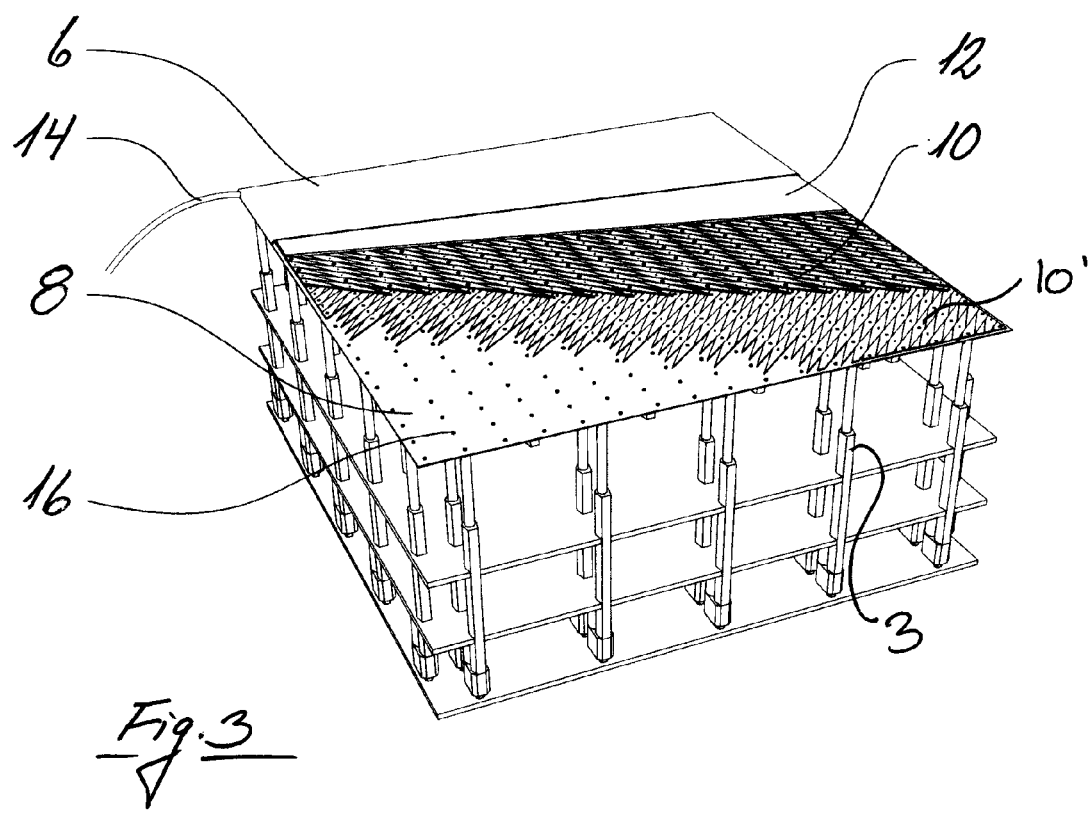
FIG. 3 shows the individual parts of a non-deflected, flexible mat in an embodiment in accordance with the invention, in which it is shown with elements and parts of elements removed and thus not in functioning state and mounted on the free ends of linear actuators.

The flexible mat 1 may be deflected from its basic shape to another single- or double-curved shape, for example by means of linear actuators 3, which may be arranged as shown in FIG. 1, FIG. 2 and FIG. 3. During deflection, the flexible mat 1 will form a surface 40, which is also characterized by having continuous curves and is regular and uniform. The surface 40 of the deflected flexible mat may be used in a moulding tool, for example a single-sided mould for laying up, for example, laminates, or formwork may be moulded to produce double-sided moulds.

In the arrangement shown in FIG. 1, the linear actuators 3 are oriented in the same direction. In other embodiments, it will be possible to construct the underlying system in other geometries as, for example, a side of a wind turbine blade or the exterior of a ship's hull, where the actuators are distributed as required and oriented perpendicularly to the flexible mat 1. The flexible mat 1 may then, in accordance with the invention, in the starting point prior to deflection, be shaped as a ship's hull or a wind turbine blade, and it is thus possible, by controlling the positions of the actuators, to make variations within the given shape, for example in order to produce a series of related test models or to build dinghies with varying volume, depending on the weight of the sailor. In accordance with the invention, it is also possible to design the flexible mat 1 in order to achieve varying rigidities in different directions. This is useful in connection with use in moulding tools as, for example, wind turbine blades, where there are larger curves and a greater need to control in the blade's cross-section than in the longitudinal direction. In the example stated, it is possible to save actuators 3 in the longitudinal direction by making the flexible mat more rigid in this direction so that it can span longer distances without too much deflection caused by any moulding pressure.

FIG. 2 shows a diagrammatic cross-section, showing the flexible mat 2 of an embodiment in accordance with the invention, where it is connected to the free ends 42 of linear actuators 3 by fixing both the flexible mat 1 and the free ends 42 of the actuators to underlying stiffeners 4. The flexible mat 1 will, as illustrated in FIG. 2, on account of its rigidity in deflection, form curves with continuous curves across a number of points that are defined by the actuators 3. In an embodiment in accordance with the invention, the connections between the flexible mat 1 and the underlying system are fixed to specific points on the flexible mat. When the flexible mat 1 is deflected, these attachments will, on account of the elasticity of the mat, be subject to a force that seeks to distribute them at uniform intervals in the deflected shape. The introduction of underlying stiffeners makes it possible for the connections to slide in the directions of the stiffeners, independently of the position of the free ends of the actuators, thereby achieving a more uniform distribution of extensions caused by deflection of the flexible mat 1, resulting in a more uniform surface 40 of the flexible mat.

In FIG. 2, the outermost actuators 3 on each side of the flexible mat 1 are shown placed more closely together than the others. The deflection of the flexible mat 1 is caused by the occurrence of a moment applied by the actuators 3. As there is no moment in the flexible mat above the outermost actuator as, in the figure, they constitute fixed simple supports, and as the moment in the configuration shown will decrease between the two outermost actuators, in some cases it will not be possible to use this area for moulding, and it may therefore be reduced to achieve a greater effective area of the flexible mat. Therefore, the outermost actuators are primarily used to control the edge conditions for an area usable for moulding encircled by the last actuators before the outermost ones.

The flexible mat 1 in accordance with the invention consists, as shown in FIG. 3, of an upper elastic cloth 6 and a lower elastic cloth 8, between which there are two or more layers of rhomboid flat elements 26, 26' and, in some embodiments of the invention, another mat 12 of an elastic foamed material such as neoprene. The upper and the lower cloths 6, 8 are hermetically joined at the edge of the flexible mat and are shown in FIG. 3 with a hose 14 that is connected to a pump and/or vacuum pump (not shown). In addition to the deflection of the flexible mat 1, in some embodiments of the invention, a vacuum is established by means of a vacuum pump between the upper and the lower elastic cloths so that atmospheric pressure is used to compress the rhomboid flat elements 10 to form a uniform surface during deflection, where the rigidity of the individual rhomboid flat elements 10 may thus be caused to contribute to a total rigidity of the flexible mat 1.

The mat 12 of an elastic foamed material may be introduced between the rhomboid flat elements 26, 26' and the cloth, the surface of which is to be used in the moulding tool for moulding, for example, to cause additional equalisation of the irregularities that occur on the top of the adjacent layer 10, 10' of rhomboid flat elements 26, 26'. This makes it possible to achieve a uniform surface of the flexible mat 1, on which the rhomboid flat elements 26, 26' cannot be distinguished.

FIG. 3 also shows, in a particularly preferred embodiment of the invention, a number of connections 16 between overlaid rhombuses' area mid points and the lower elastic cloth 8. During deflection of the flexible mat 1, these connections 16 ensure that the associated overlaid rhombuses remain distributed appropriately uniformly inside the mat 1, as the uniform distribution of internal stresses in the elastic mat 1 will entail a uniform distribution of the connections. The connections 16 between the individual layers 10, 10' of rhombuses will also ensure that the rhombuses do not become jammed between each other during use, as the layers 10, 10' of rhomboid flat elements are mutually rotated.

During deflection of the flexible mat 1, a space will occur between adjacent rhombuses in the layers 10, 10' when they move away from each other, as a result of extensions of the flexible mat. This space permits a modest but necessary rotation of the individual rhombuses 26, 26' as a result of changes in the geometry of the mat. It is also possible, in some versions, to design the mat so that compression of the mat's plane is possible. This is achieved by the mat being designed, in its starting point prior to deflection, with suitable spacing between the individual rhombuses so they can be pushed together by means of compression.

Figure 4:
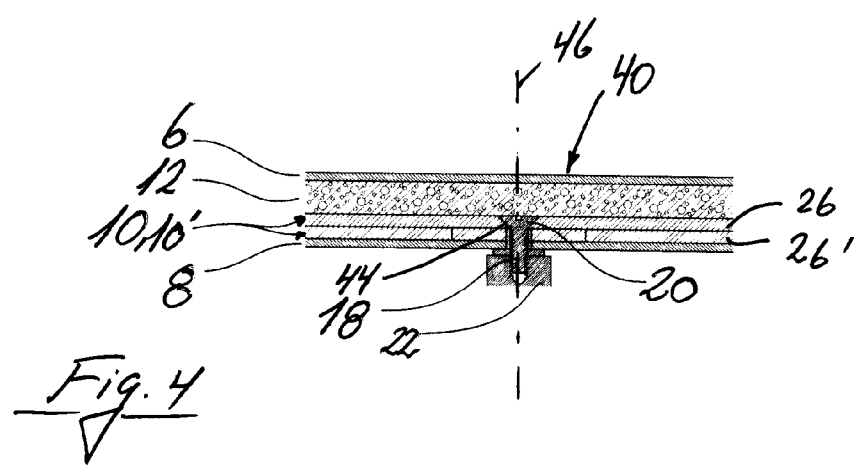
FIG. 4 is a cross-sectional view of a section of a flexible mat, showing a mechanical connection between two rhombuses and between the flexible mat and the free ends of the actuators, or to a lattice of underlying stiffeners connected to free ends of the actuators, in an embodiment in accordance with the invention.

FIG. 4 shows an example of a connection 16 in accordance with the invention in which a screw 18 is used to create the connection between two layers of rhomboid flat elements 10, 10', the lower elastic cloth 8 and part of the underlying system 22, which may be part of a fitting mounted in a suitable manner, possibly a ball joint, directly on the free end 42 of an actuator 3, or a fitting mounted on underlying stiffeners. The top of the head 20 of the screw is flat so that the surface can form part of the surface of the upper layer of flexible rhombuses. The conical bottom 44 of the screw 20 is used, in the example shown, to attach the layers 10, 10' of rhomboid elements and the lower elastic cloth 8 to the connection 18. The mat of a foamed material 12 and the upper elastic cloth 6 may be fixed by means of vacuum, as described earlier.

An important feature that can be provided in the example shown in FIG. 4 is that it is possible for the layers 10, 10' of rhomboid elements 26, 26' and the lower elastic cloth 8 to rotate in the connection 18 around the longitudinal axis 46 of the screw. This is a precondition for the rhombuses 26, 26' in the flexible mat 1 to be able to perform the rotation described earlier to adapt to changes in the flexible mat's geometry during its deflection from its basic shape.

Figure 5:
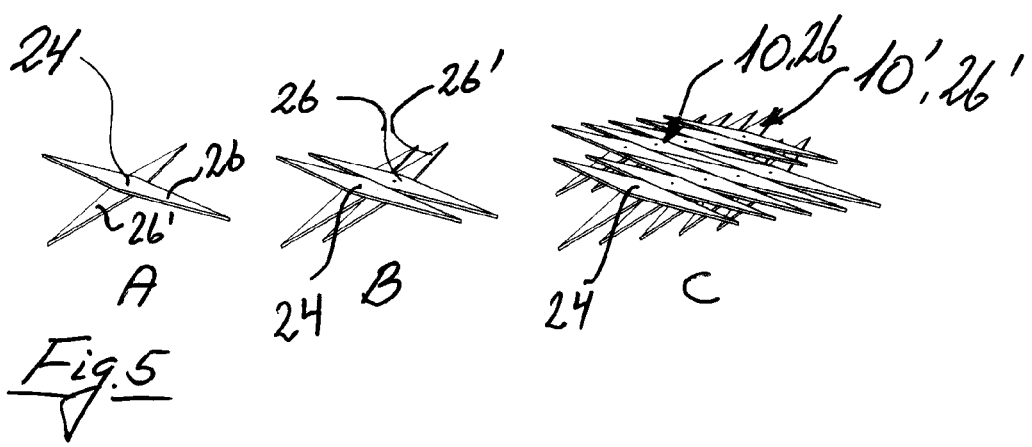
FIG. 5 shows the overlaying of two layers of rhomboid flat elements in a preferred embodiment of the invention.

FIG. 5 shows an embodiment of the overlaying of the rhomboid flat elements 10, 10' in accordance with the invention. FIG. 5A shows two rhomboid flat elements 26, 26' from two overlaid layers 10, 10' with mutually overlaid area mid points and connected via the area center point with a split pin 24. In the embodiment shown, the two overlaid layers 10, 10' of rhomboid flat elements are mutually rotated by 90° as described in an embodiment in accordance with the invention. FIG. 5B shows how two adjacent similar rhombuses 26, 26', each in its layer equivalent to the two first rhombuses and also connected via their area mid points, may be positioned so the two rhombuses in both layers are caused to lie edge to edge.

FIG. 5C illustrates, in accordance with the invention, how several such sets of mutually overlaid and connected rhombuses 26, 26' may be positioned so the rhombuses 26, 26' in both layers 10, 10' mutually form a sealed surface without mutual spacing between adjacent rhombuses. This feature is characteristic of layers consisting of rhomboid flat elements in accordance with the invention as such a surface can only be achieved by using rhombuses of specific angles as described in the invention. The example shown of the embodiment constitutes a flat sheet as the basic shape prior to deflection. With a basic shape that is significantly different from this, for example a wind turbine blade, the individual elements will have to have a geometry that permits them to form a closed surface without mutual spacing or with mutual spacing for a specific purpose as described earlier. However, as it will usually be necessary to have relatively small rhomboid flat elements in comparison with the curvatures required in the basic shape, the individual rhombuses in the flexible mat concerned will essentially have a shape as with the formation of a flat basic shape as shown. In accordance with the invention, there are several ways of packing rhombuses in several layers to create a closed surface other than that shown.

Figure 6:
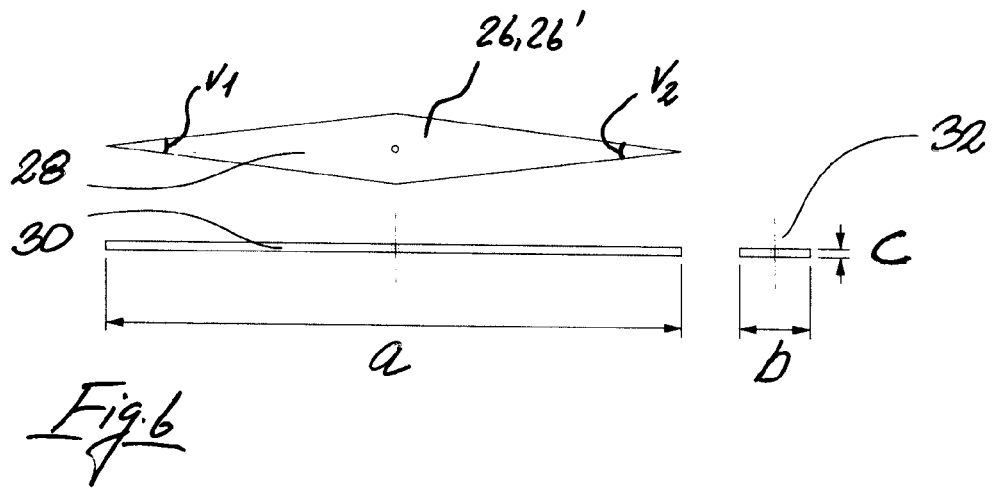
FIG. 6 shows an example of a rhomboid flat element illustrated in plans and elevations in accordance with the invention.

FIG. 6 shows an example of a rhomboid flat element 26, 26' in accordance with the invention, illustrated in the plan shown with position no. 28, a first elevation, which is shown with position no. 30, and a second elevation, which is shown with position no. 32, where a is the rhomboid flat element's length, b is the width and c is the thickness. In accordance with the invention, the rhomboid flat element 10, 10' is characterized by having two angles v1 and v2 of between 13 and 15 degrees, most preferably 14 degrees, or any angle v that satisfies the expression tan(v)=1/N, where N is an integer other than 0. The angle of 14 degrees is found when N=4 and is considered to be the most preferred solution as lower values of N result in a shorter rhombus which, as it cannot be deflected to be double-curved, results in a less uniform surface of the layers of rhomboid flat elements. Higher values of N result in slimmer rhombuses which, due to their length, cannot as easily perform the rotations necessary during the deflection of the flexible mat 1.

The thickness c of the rhombuses 10, 10' in the individual layers may be vary ied, in accordance with some embodiments, to achieve different rigidity in deflection in order thus to form layers of mutually different rigidities and thus different rigidities in several directions, as described earlier.

It is also possible to optimize the course of rigidities by changing material properties or by placing shallow cuts (not shown) in the individual rhombuses, for example to make it possible for the rhombuses to assume a slightly double-curved shape in connection with a relative weakness of the material's rigidity in the transverse direction of the rhombus, or to be deflected in a more expedient manner in the longitudinal direction, for example so that each rhombus is formed to be deflected in a circular shape from a uniformly distributed load and a single support under the center.

The individual rhombuses are made of an elastic material that can be deflected expediently and subsequently, by means of its own elasticity, return to an original shape without permanent changes in shape or material properties.

The invention claimed is:

1. A device for use in a molding tool, comprising:
a system of rhomboid flat elements of an elastic deformable material arranged in at least two layers that are mutually relatively rotated with respect to each other,
a first upper cloth of an elastic deformable material and a second lower cloth of an elastic deformable material, which cloths are imperviously joined along lateral edge areas thereof and form an adjustable impervious chamber,
wherein the system of rhomboid flat elements are enclosed in the chamber formed by the joined upper and lower cloths so as to form a flexible mat, and
wherein the flexible mat is mechanically connected to free ends of actuators in such a way that a given point on a surface of the flexible mat has a location determined based on a position of a free end of a respective one of the actuators which is associated with the flexible mat at said given point.

2. A device in accordance with claim 1, wherein a pressure is established and maintained in said chamber that is lower than at external sides of the flexible mat.

3. A device in accordance with claim 2, wherein a total rigidity for deflection is provided by the rhomboid flat elements.

4. A device in accordance with claim 3, wherein all mutually relatively rotated layers of rhomboid flat elements are formed of rhomboid flat elements of the same thickness and rigidity.

5. A device in accordance with claim 3, wherein the rhombuses in the mutually rotated layers of rhomboid flat elements vary in at least one of thickness and rigidity.

6. A device in accordance with claim 1, wherein the rhomboid elements have a mutual spacing of a size which is determined by an amount in which the surface of the mat has been deformed from an initial flat shape thereof.

7. A device in accordance with claim 1, wherein the rhomboid flat elements in at least one of the layers of rhomboid flat elements are arranged on one of a flat, single-curved and double-curved surface formed by the flexible mat, form a starting point for dynamic deflections and jointly form a uniform and approximately closed surface.

8. A device in accordance with claim 7, wherein positions of the free ends of the respective linear actuators are registered and supplied to a data processing unit with signal devices to control the movement of the free end of each actuator, and thus, the location of the point on the flexible mat positioned by the free end of the actuator.

9. A device in accordance with claim 4, wherein the flat rhomboid elements in adjacent layers are arranged in such a way that an area center point of each rhomboid in a given layer is located directly above or below an area center point of a respective rhomboid flat element in an adjacent layer.

10. A device in accordance with claim 9, wherein a number of the rhomboid elements in a layer are individually connected, via their area center point, to the area center point the respective rhomboid flat element in the adjacent layer so that mutual displacement in the plane of the surface formed by the flexible mat between two overlaid connected rhombuses is prevented.

11. A device in accordance with claim 10, wherein a number of connections between rhombuses in two or more overlaid layers also attach the connected flat rhomboid elements to one of the first flexible cloth and the second flexible cloth so that an extension of the flexible mat in its own plane during deflection, and thus an elastic displacement of the first and the second flexible cloths result in uniformly distributed mutual spacing between adjacent rhombuses in the overlaid layers concerned by mutual relative movement of the connections away from each other as a result of elastic extension of the cloth between connections.

12. A device in accordance with claim 11, wherein a number of connections between at least two layers of rhomboid elements and one of the first elastic cloth and the second elastic cloth also constitute mechanical connections between the flexible mat and one of the free ends of the actuators and mechanical connections to a lattice of underlying stiffeners connected to the free ends of the actuators.

13. A device in accordance with claim 12, wherein the rhomboid flat elements at a given point have two angles v1 and v2, seen from a direction perpendicular to the surface of the mat of between 13° and 15°.

14. A device in accordance with claim 12, wherein the rhomboid flat elements at a given point have two angles v1 and v2, seen from a direction perpendicular to the surface of the flexible mat that satisfies the expression tan(v)=1/N, where N is an integer other than zero.

15. A device in accordance with claim 13, wherein at least two of the layers of rhomboid flat elements are mutually relatively rotated at an angle of between 80° and 100° about an axis perpendicular to the surface of the flexible mat.

16. A device in accordance with claim 14, wherein the rhomboid flat elements, in deflection about an axis running between opposing acute angles v1 and v2, have a reduced rigidity due to the rhomboid elements being made of an anisotropic material and the geometric shape of the rhombuses.

17. A device in accordance with claim 16, wherein distribution of moments of resistance in a longitudinal direction of the rhomboid flat elements causes a circular or curved deflection under an impact of an evenly distributed surface load perpendicular to one side of the rhombuses and a counteracting support in the center of the opposite side.

18. A device in accordance with claim 17, wherein, between the first upper cloth and the layers of rhomboid flat elements, there is a mat of an elastic foam material.

19. A device in accordance with claim 18, wherein said elastic foam material is neoprene.

20. A device in accordance with claim 2, wherein said inner chamber is connected via an airtight connection to a suction side of a vacuum pump.

21. A device in accordance with claim 1, wherein an external surface of the first upper cloth is made of a material of a density and robustness sufficient to resist physical and chemical impact of a molding process directly on the surface.

22. A device in accordance with claim 1, further comprising means for ensuring that limits of the flexible cloth are not exceed during deflection of the flexible mat.

23. A method for producing a single- or double-curved workpiece comprises the steps of laying out material on the surface of a flexible mat, formed of a first upper cloth of an elastic deformable material and a second lower cloth of an elastic deformable material, which cloths are imperviously joined along lateral edge areas thereof and form an adjustable impervious chamber, and a system of rhomboid flat elements enclosed in the chamber formed by the joined upper and lower cloths, disposed on a surface of a mold,
followed by deflection of the flexible mat to a desired shape,
then delivering a thermoplastic material into the mold while maintaining the shape into which the flexible mat was deflected until a time at which the material has attained a sufficiently self-sustaining shape.

* * * * *